Nov. 9, 1943. K. M. HERSTEIN 2,334,091
PRODUCTION OF ACROLEIN
Filed July 27, 1938
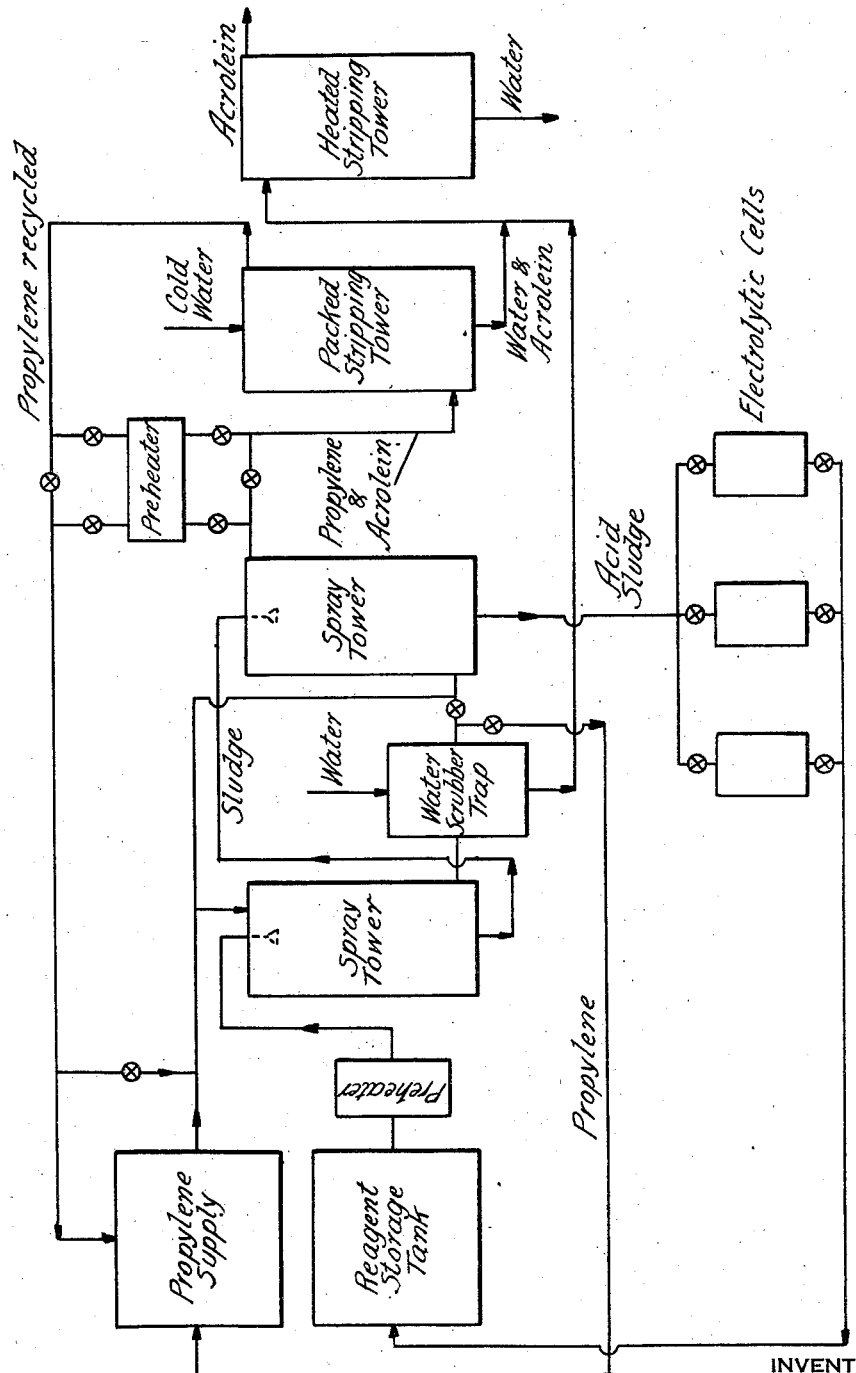
INVENTOR
Karl M. Herstein
BY
Pennie, Davis, Marvin and Edmonds
ATTORNEY Patented Nov. 9, 1943

2,334,091

UNITED STATES PATENT OFFICE 2,334,091

PRODUCTION OF ACROLEIN

Karl M. Herstein, Brooklyn, N. Y., assignor to Acrolein Corporation, a corporation of Delaware Application July 27, 1938, Serial No. 221,629

1 Claim. (Cl. 260—604)

This invention relates to improvements in the production of acrolein from propylene with the use of an acid solution containing mercuric sulfate, known as Denige's reagent.

It is known that propylene is absorbed by Denige's reagent at a temperature of about 85° C. with the production of a yellow precipitate which on further heating decomposes with liberation of acrolein, but no attempt has heretofore been made, so far as I am aware, to produce acrolein, except as a laboratory experiment, in this way.

The present invention provides an improved method for the production of acrolein in a practical way, with advantageous utilization of the reagent and regeneration thereof and with the production of acrolein of high purity in an advantageous manner.

Denige's reagent is prepared from about 5 parts by weight of mercuric oxide, about 36.8 parts by weight of sulfuric acid (66° Bé.) and about 100 parts by weight of water. The conversion of propylene into acrolein by absorption of propylene in the reagent and subsequent decomposition leaves the mercury reduced as mercurous sulfate and an acid solution containing some organic matter and having reducing properties. The mercurous sulfate formed is almost completely insoluble in the liquid and tends to separate as a sludge or deposit.

The overall equation for the reaction involved in the production of acrolein from propylene appears to be as follows:

$C_3H_6 + 4HgSO_4 + H_2O \rightarrow C_3H_4O + 2Hg_2SO_4 + 2H_2SO_4$

According to the improved process of the present invention propylene in excess is brought into contact with the hot reagent to effect substantially complete utilization of the reagent and decomposition of the resulting intermediate product is thereafter obtained with the use of an excess of propylene which dilutes the acrolein formed and facilitates its rapid removal from the zone of high temperature, and the resulting mixture of propylene and acrolein is subsequently treated to recover the propylene for reuse and to give acrolein of high purity.

The reactions involved in the conversion of propylene into acrolein include the absorption of propylene in the reagent with the formation of an intermediate precipitate and the decomposition of this precipitate on further heating to form acrolein and mercurous sulfate. The present invention provides an improved method for bringing about these reactions so that they may be advantageously combined as part of a single complete operation.

The mixture of propylene and acrolein is subsequently treated to separate the acrolein from the propylene and the propylene thus separated is returned to the process while the acrolein is separately recovered. This separation of the acrolein from the propylene may be accomplished by cooling and refrigeration to condense and liquefy the acrolein but it is advantageously accomplished by scrubbing the mixed gases with cold water to absorb the acrolein as an aqueous solution from which the acrolein can be subsequently separated by distillation to give acrolein of high purity.

The reagent used in the process is converted into an acid residual liquor containing mercurous sulfate and with various organic impurities. This residue contains practically all of the original acid used but is not adapted for further use in the process. This residue either as a whole or after separation of its constituents may be treated so that an additional amount of fresh reagent can be produced therefrom for further use in the process, thus making the process cyclic in nature by regenerating fresh reagent from the reagent residue.

Thus the acid sludge from the chemical reactions may be advantageously subjected to oxidation as a whole by the use of an electrolytic cell of the diaphragm type using an insoluble anode. By introducing the sludge into the anode chamber of a diaphragm cell and by using a fairly high current density the sludge is subjected to oxidation with conversion of the mercurous sulfate precipitate into mercuric sulfate in solution and at the same time organic matter present in the sludge is oxidized. The resulting oxidized solution is similar in composition to the original solution and can advantageously be returned for reuse in the process.

Instead of subjecting the entire acid sludge to oxidation, this sludge can be separated and the mercurous sulfate precipitate separately treated. This precipitated mercurous sulfate, which is very dense and granular, may be separated by decantation from its acid mother liquor and oxidized by treatment with nitric acid. When nitric acid is thus used the resulting oxides formed can be advantageously recovered. The mercurous sulfate can also be oxidized by roasting under suitable conditions in the presence of an excess of oxygen for the regeneration of mercuric sulfate. The acid mother liquor, from which the mercurous sulfate is separated for separate treatment, can similarly be subjected to oxidation, e. g., with nitric acid to remove or oxidize organic compounds and the resulting mother liquor can then be recombined with the regenerated mercuric sulfate, thus regenerating the combined reagent for reuse.

The invention will be further described in connection with the accompanying drawing which illustrates, in a conventional and diagrammatic manner, a flow sheet or arrangement of apparatus and sequence of steps adapted for use in practicing the process, but it will be understood that the invention is illustrated thereby but is not limited thereto. In the accompanying drawing The figure shows an arrangement for practice of the process.

In the arrangement of the illustration two separate spray towers are shown, one for the absorption of the propylene in the reagent to form the intermediate precipitate and the second for the further reaction of this intermediate precipitate with resulting formation of acrolein. The first spray tower is shown as supplied with the reagent through a preheater by which it may be preheated to the proper temperature and with both the reagent and the propylene entering at the top of the spray tower with intimate spraying of the reagent into the propylene and concurrent flow of the solution and propylene through the tower, with the propylene gas in considerable excess. This concurrent flow of gas and liquid brings the fresh reagent into contact with the propylene and prevents it from coming into contact with any acrolein such as might take place with a countercurrent flow.

At the bottom of the first tower the excess propylene is taken off through a water scrubber trap where it is scrubbed with water to remove any acrolein that may be contained in it and the resulting propylene is then shown as being returned to the propylene supply or alternately it may be supplied to the second spray tower.

The acid sludge from the first spray tower containing the products resulting from the reaction between the propylene and the acid mercuric sulfate reagent, is pumped to the top of another tower and again sprayed into the tower countercurrent to a rapid stream of propylene gas entering near the bottom. The time taken in pumping the sludge from the bottom of the first tower to the second can be so regulated that the desired decomposition will have largely taken place before the sludge enters the second spray tower and the acrolein thus liberated and which escapes in the second tower is swept out by the current of propylene and the mixture of propylene and acrolein is shown as going to a packed stripping tower where the acrolein is absorbed in cold water and the propylene freed from acroelein for return to the process or to the propylene supply either directly or through a preheater in heat interchanging relation with the hot propylene and acrolein vapors coming from the second spray tower.

The solution of acrolein in water coming from the packed stripping tower together with the scrubbing water from the water scrubber trap are combined and introduced into a heated stripping tower or still where the acrolein is distilled from its water solution.

The method of regenerating the acid sludge from the second spray tower is shown as by electrolytic cells of which three are illustrated but of which any desired number can be used.

It will be understood that the flow sheet illustrated and the diagrammatic arrangement of apparatus is not intended to show the parts to scale but it is intended to be illustrative of the types of towers, etc. which can advantageously be used in the process.

The spray towers are unpacked towers. The packed stripping tower is filled with suitable packing material so that the gases will be intimately washed by the cold water running down over the packing to insure substantially complete scrubbing of the acrolein from the mixed gases so that the acrolein will be recovered in water solution at the bottom of the tower, leaving the propylene available for recycling. The heated stripping tower or column may be made up of fractionating plates in which the acrolein is recovered at the head and pure water at the bottom. With a suitable tower the acrolein can be recovered in substantially anhydrous form since it forms no constant boiling mixture with water vapor and the boiling points are approximately 40° apart.

The temperature during the first stage of the process, i. e., the initial reaction between the propylene and the acid mercuric surfate reagent, is advantageously around 85° C. and in general should not be higher than about 105° C. During the next stage of the process, that is, the separation of acrolein from the reaction mixture, any suitable temperature may be employed. Advantageously, the same temperature that was employed in the first stage of the process may be used, or the temperature may be somewhat lower. The first operation can be carried out at atmospheric pressure, but it can advantageously be carried out at somewhat higher pressures of the order of 2 or 3 atmospheres with economy of space in the towers. It is one advantage of the process that extreme high pressures are not required.

Acrolein, especially in the presence of the acid mercuric sulfate reagent, is readily decomposed if kept at high temperatures for any considerable length of time. It is one advantage of the present process that the acrolein is rapidly removed from the high temperature part of the apparatus by the current of propylene so that objectionable decomposition is obviated or minimized.

Although an intermediate precipitate is formed by absorption of the propylene and although the sludge resulting from the decomposition of this precipitate also contains a precipitate (the mercurous sulfate), these precipitates and the sludges containing them are advantageously handled in the present process. In the arrangement shown the spraying of the reagent brings about intimate contact of the reagent with the excess of propylene and the sludge formed is readily handled by pumping and introduced as a spray into the second tower from which the sludge can then be transferred to the electrolytic cells or to other place of treatment and regeneration of the reagent.

In the operation of the process the reagent may be kept hot in the storage tank but ordinarily it will be kept at a lower temperature and preheated to the required temperature in a preheater before it is introduced into the first spray tower. The spray towers are shown as unheated and with the heat supplied by the preheating of the solution; but further heating of the spray towers may be employed to maintain the desired temperature.

The regeneration of the reagent may be either intermittent or continuous and where intermittent, as with the use of electrolytic cells for oxidizing the sludge, a sufficiently large number of cells can be used, and a sufficiently large amount of the reagent can be supplied to obtain in effect a substantially continuous operation. The regeneration of the reagent makes it unnecessary to supply new reagent except to make up for losses and to adjust the composition of the reagent from time to time if required. Should the reagent after repeated regeneration and reuse become contaminated, the regeneration of the sludge as a whole may be replaced by separation of the mercurous sulfate precipitate and its separate oxidation to form mercuric or oxymercuric sulfate and by separately purifying the waste acid, or replacing it with fresh acid.

In the foregoing description of my process propylene has been used as a convenient medium for sweeping acrolein out of the reaction mixture. It should be understood, however, that, in general, any gas or vapor which does not destroy acrolein may be used for this purpose, for example, water vapor, carbon dioxide, nitrogen or suitable hydrocarbons, etc., may be used.

It will thus be seen that the invention provides an improved and advantageous method for the production of acrolein in a simple and advantageous manner and with continuous operation, in which the reagents can be regenerated and repeatedly reused and in which the propylene is advantageously employed in large excess in the process, with advantages such as those hereinbefore referred to.

I claim:

The continuous method of producing acrolein which comprises continuously spraying a hot aqueous mercuric sulfate reagent into a current of propylene, with concurrent flow of the spray and gas and production of an intermediate reaction product in suspension, continuously spraying the resulting suspension with accompanying decomposition into a current of propylene countercurrent thereto, whereby the acrolein is removed in admixture with propylene, and subsequently treating the admixed propylene and acrolein to separate the acrolein therefrom.

KARL M. HERSTEIN.